US012628052B2

(12) United States Patent
Cui et al.

(10) Patent No.: US 12,628,052 B2
(45) Date of Patent: May 12, 2026

(54) EPOCH TIME ACQUISITION FOR NON-TERRESTRIAL NETWORKS (NTN) HANDOVER

(71) Applicant: Apple Inc., Cupertino, CA (US)

(72) Inventors: Jie Cui, San Jose, CA (US); Fangli Xu, Beijing (CN); Chunxuan Ye, San Diego, CA (US); Yang Tang, San Jose, CA (US); Hong He, San Jose, CA (US); Qiming Li, Beijing (CN); Yuqin Chen, Beijing (CN); Dawei Zhang, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 296 days.

(21) Appl. No.: 18/507,243

(22) Filed: Nov. 13, 2023

(65) Prior Publication Data

US 2024/0187938 A1     Jun. 6, 2024

Related U.S. Application Data

(60) Provisional application No. 63/430,089, filed on Dec. 5, 2022.

(51) Int. Cl.
*H04W 36/00* (2009.01)
*H04W 56/00* (2009.01)
*H04W 84/06* (2009.01)

(52) U.S. Cl.
CPC ... *H04W 36/0061* (2013.01); *H04W 56/0015* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 2022/0386200 | A1* | 12/2022 | Wang | H04W 36/362 |
| 2024/0056170 | A1* | 2/2024 | Shrestha | H04W 56/0005 |
| 2025/0280384 | A1* | 9/2025 | Nishio | H04B 7/1853 |

FOREIGN PATENT DOCUMENTS

WO      WO 2023153011 A1      8/2023

OTHER PUBLICATIONS

International Search Report and Written Opinion directed to related International Application No. PCT/US2023/082249, mailed Apr. 18, 2024; 13 pages.
OPPO, "Discussion on remaining issue for NTN-NR," 3GPP TSG RAN WG1 #109-e, e-Meeting, May 9-20, 2022, R1-2203990; 7 pages.
OPPO, "Discussion on neighbour cell's epoch time and Koffset's ambiguity issue," 3GPP TSG-RAN WG2 Meeting #118-e, Electronic, May 9-20, 2022, R2-2204714; 2 pages.

* cited by examiner

*Primary Examiner* — Robert M Morlan
(74) *Attorney, Agent, or Firm* — Sterne, Kessler, Goldstein & Fox P.L.L.C.

(57)      ABSTRACT

Aspects are described for a user equipment (UE) comprising a transceiver configured to enable wireless communication with a serving cell and a target cell and a processor communicatively coupled to the transceiver. The processor is configured to receive a handover command from the serving cell. The handover command comprises an epoch index and ephemeris information of the target cell. The processor is further configured to determine an epoch time of the target cell based on the epoch index and perform time synchronization with the target cell using the epoch time and the ephemeris information.

16 Claims, 7 Drawing Sheets

500

502 Retrieve Epoch Index

504 Generate a HO Command

506 Transmit the HO Command

Computer System 700

EPOCH TIME ACQUISITION FOR NON-TERRESTRIAL NETWORKS (NTN) HANDOVER

CROSS REFERENCES

This application claims the benefit of U.S. Provisional Application No. 63/430,089 filed Dec. 5, 2022, titled "EPOCH TIME ACQUISITION FOR NON-TERRES-TRIAL NETWORKS (NTN) HANDOVER," the content of which is herein incorporated by reference in its entirety.

BACKGROUND

Field

The described aspects generally relate to an epoch time acquisition process in wireless communications that a wireless network that includes one or more satellites.

SUMMARY

Some aspects of this disclosure relate to systems, apparatuses, and methods for implementing an epoch time acquisition in a non-terrestrial networks (NTN) handover procedure. For example, the systems, the apparatuses, and the methods are provided for determining an epoch time based on an epoch index of a target cell.

Some aspects of this disclosure relate to a user equipment (UE) comprising a transceiver configured to enable wireless communication with a serving cell and a target cell and a processor communicatively coupled to the transceiver. The processor is configured to receive a handover command from the serving cell. The handover command comprises an epoch index and ephemeris information of the target cell. The processor is further configured to determine an epoch time of the target cell based on the epoch index and perform time synchronization with the target cell using the epoch time and the ephemeris information.

Some aspects of this disclosure relate to a method of operating a UE. The method comprises receiving a handover command from a serving cell. The handover command comprises an epoch index and ephemeris information of a target cell. The method further comprises determining an epoch time of the target cell based on the epoch index and performing time synchronization with the target cell using the epoch time and the ephemeris information.

Some aspects of this disclosure relate to a base station comprising a transceiver configured to enable wireless communication with a UE and a second base station and a processor communicatively coupled to the transceiver. The processor is configured to generate a handover command that comprises an epoch index and ephemeris information of the second base station and transmit the handover command to the UE. The epoch index is in reference to timing of the base station. The epoch index is associated with an epoch time for the UE to perform time synchronization with the second base station.

This Summary is provided merely for the purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
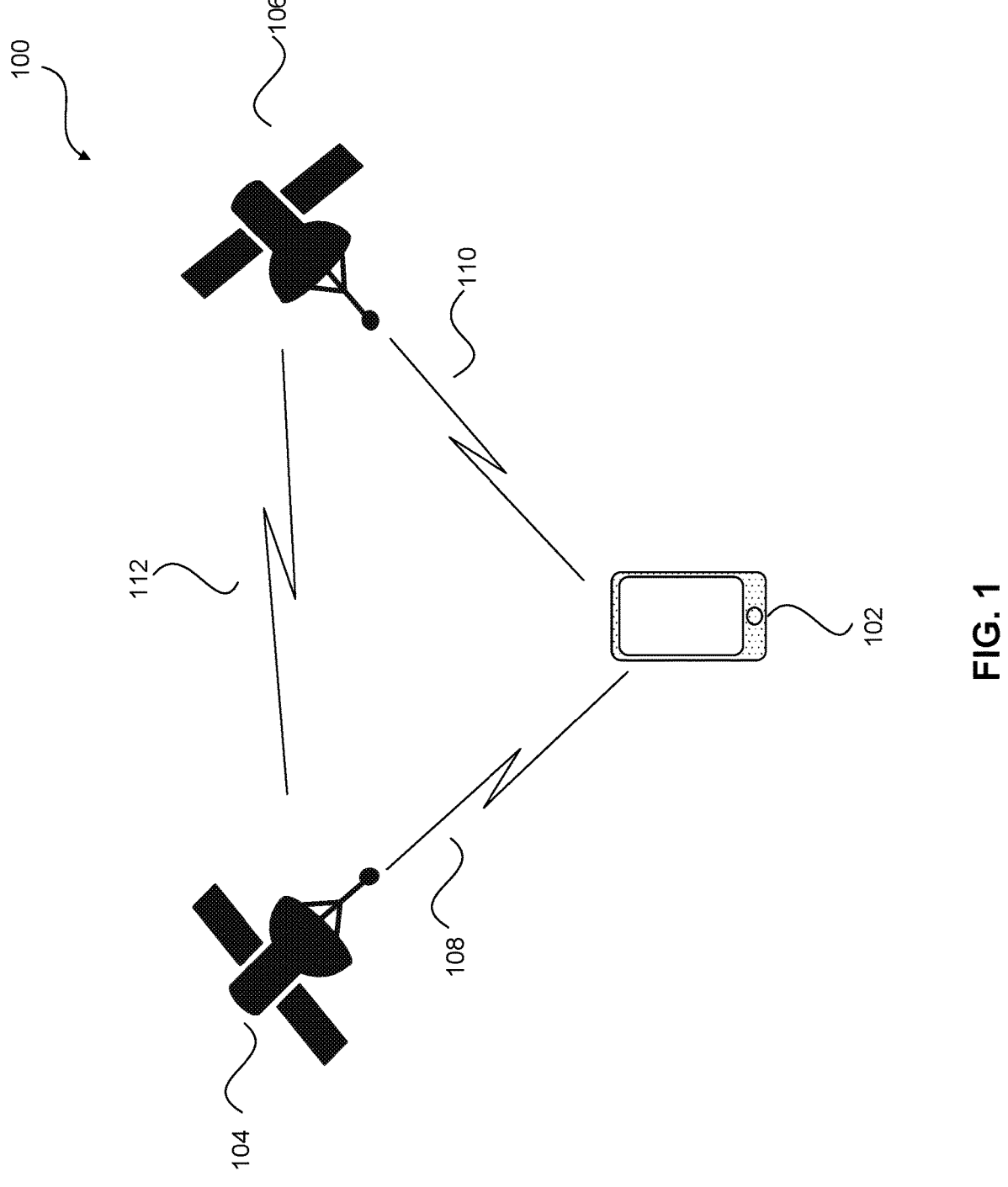
FIG. 1 illustrates an example system implementing a non-terrestrial networks (NTN) handover procedure, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure relate to systems, apparatuses, and methods for implementing an epoch time acquisition process in wireless communications. For example, the systems, the apparatuses, and the methods are provided for determining an epoch time based on an epoch index of a target cell.

In some aspects, a UE communicates with a serving cell via a wireless connection to transmit and receive data. When the UE moves towards an edge of the serving cell, the UE can be configured to hand over to another cell. For example, the UE can establish a wireless connection with a target cell, which provides stronger signals compared with the serving cell. In some aspects, the UE performs synchronization, such as downlink synchronization, with the target cell when establishing the wireless connection with the target cell.

In some aspects, the serving cell and the target cell can be supported by NTN base stations, such as satellites. For example, the UE can connect with the serving cell and the target cell via a first satellite and a second satellite, respectively. In such a case, the UE may need ephemeris information, such as velocity and position of a satellite, to connect with the satellite. For example, the UE may need velocity and position information of the second satellite to perform the downlink synchronization with the target cell. In some aspects, the serving cell can transmit a handover command to the UE, wherein the handover command includes the ephemeris information of the second satellite of the target cell. In addition, because the second satellite can change its velocity and position over time, the ephemeris information of the target cell changes over time. Therefore, the UE also needs to know when the ephemeris information is effective, which is the epoch time. In such a case, the UE is required to perform the synchronization, such as the downlink synchronization, with the target cell to determine an epoch time based on the epoch index. Phrased differently, the UE is required to perform the synchronization to determine when the ephemeris information is effective. Thus, the UE faces a deadlock situation, where the synchronization requires the epoch time that is obtained via the synchronization.

In some aspects, the serving cell can include an epoch index in the handover command that is transmitted to the UE. However, the serving cell may receive the epoch index from the target cell and thus the epoch index can be in reference to timing of the second satellite. For example, the epoch index can be a system frame number (SFN) of the second satellite. To resolve the deadlock situation, the serving cell can request the epoch index from the target cell and convert the epoch index to be in reference to timing of the serving cell. Because the UE has completed the synchronization with the serving cell previously when connecting to the serving cell, the UE can determine the epoch time of the target cell using the converted epoch index. In such a case, the UE can determine when the ephemeris information is effective and perform the synchronization with the target cell based on the ephemeris information.

In some aspects, the second satellite that supports the target cell can be in a geosynchronous orbit (GSO), such as a geostationary orbit (GEO). In such a case, the ephemeris information may remain the same over time. For example, the position and the velocity of the second satellite relative to the target cell may remain the same. In such a case, the ephemeris information is likely to be effective regardless of the epoch time. Thus, the UE can perform the synchronization using the ephemeris information without obtaining the epoch time. On the other hand, the second satellite can be in a non-GSO, such as a low-Earth orbit (LEO). In such a case, the UE needs to obtain the epoch time to perform the synchronization as discussed above.

FIG. 1 illustrates an example system 100 implementing an epoch time acquisition process, according to some aspects of the disclosure. The example system 100 is provided for the purpose of illustration only and does not limit the disclosed aspects. The example system 100 may include, but is not limited to, a UE 102, a base station 104 supporting a first communication cell, and a base station 106 supporting a second communication cell. At least a portion of each of base station 106 and base station 104 are implemented as satellites, as shown in FIG. 1. Additionally, in embodiments, base stations 104 and 106 may also include respective ground stations (not shown) to enable communications for the corresponding cell. The UE 102 may be implemented as electronic devices configured to operate based on a wide variety of wireless communication techniques. These techniques may include, but are not limited to, techniques based on 3rd Generation Partnership Project (3GPP) standards. For example, the UE 102 can be configured to operate using one or more 3GPP releases, such as Release 15 (Rel-15), Release 16 (Rel-16), Release 17 (Rel-17), or other 3GPP releases. The UE 102 may include, but is not limited to, wireless communication devices, smartphones, laptops, desktops, tablets, personal assistants, monitors, televisions, wearable devices, Internet of Things (IoT) devices, vehicle communication devices, and the like. The base stations 104 and 106 may include one or more nodes configured to operate based on a wide variety of wireless communication techniques such as, but not limited to, techniques based on the 3GPP standards. For example, the base stations 104 and 106 may include nodes configured to operate using Rel-15, Rel-16, Rel-17, or other 3GPP releases. The base stations 104 and 106 may include, but not limited to, satellites, high altitude platforms (HAPs) such as hot air balloons, air-borne base stations, unmanned aerial vehicles (UAVs), NodeBs, eNodeBs, gNBs, new radio base stations (NR BSs), access points (APs), remote radio heads, relay stations, and others.

In some aspects, the UE 102 connects with the base station 104 via a communication link 108. The communication link 108 can include uplink (UL) connections and downlink (DL) connections. In some aspects, the UE 102 can move away from the base station 104 and towards the base station 106. The base station 104 can determine that the UE 102 requires a handover operation to connect with the base station 106. For example, the base station 104 can monitor movements and locations of the UE 102. When the UE 102 moves close to a cell edge of the base station 104, the base station 104 determines that a handover operation is required. The base station 104 may also be aware of a topology of a network, such as an NTN, that includes the base stations 104 and 106. Therefore, the base station 104 can determine that the UE 102 moves towards the base station 106 based on the movements and the locations of the UE 102. In such a case, the base station 104 can transmit a handover command to the UE 102 to configure the UE to hand over to the base station 106. The handover command can include ephemeris information and an epoch index of the base station 106. The UE 102 can perform the synchronization with the base station 106 to establish a communication link 110 using the ephemeris information and the epoch index.

In some aspects, the UE 102 can also determine that the handover operation is required by monitoring received signal strengths. For example, when the UE 102 moves away from the base station 104, the UE 102 can determine that strengths of signals received from the base station 104 are below a threshold and the UE 102 needs to connect to another base station to main qualities of service (QoS), such as data throughput and communication delays. Furthermore, the UE 102 can determine a target base station to hand over to using at least one of two approaches. First, the UE 102 can determine the target base station based on the handover command. For example, the UE can transmit a handover request to the base station 104 indicating that the handover operation is required but the target base station is to be determined. In response to receiving the handover request, the base station 104 can determine that the UE 102 needs to hand over to the base station 106 and transmit the handover command to the UE 102 as discussed above. The handover command can explicitly indicate the base station 106 to be the target base station. Second, the UE 102 can determine the base station without the handover command. For example, the UE 102 can determine to hand over to the base station 106 by monitoring signals received from the base station 106. For example, the UE 102 may determine that strengths of signals received from the base station 106 are higher than a second threshold. For another example, the UE 102 may also determine that the strengths of signals received from the base station 106 are higher than strengths of signals received from other base stations. In either case, the UE 102 can also transmit a handover request to the base station 104 indicating that the target base station is the base station 106.

In some aspects, the base station 104 can obtain the ephemeris information and the epoch index from the base station 106. For example, the base station 104 connects with the base station 106 via a communication link 112. The communication link 112 can be a direct wireless connection. The communication link 112 can also be an indirect connection via one or more ground stations. In some aspects, the base station 104 can transmit a request for information to the base station 106, which can transmit a response back to the base station 104. The response can include the ephemeris information and the epoch index of the base station 106. The bases station 104 can repeatedly transmit the request for information to the base station 106. For example, the base station 104 can transmit the request for information periodically. In such a case, when the base station 104 determines that the base station 106 is the target base station for the handover operation, the base station 104 already possesses the ephemeris information and the epoch index of the base station 106 and can transmit the handover command to the UE 102 without waiting to receive the ephemeris information and the epoch index from the base station 106. In some aspects, the base station 104 can transmit the request for information to the base station 106 after determining that the base station 106 is the target base station. In such a case, the base station 104 waits for the response from the base station 106 and then transmits the handover command to the UE. In other words, the transmission of the handover command is delayed, but the ephemeris information and the epoch index included in the handover command are the most recent.

In some aspects, the base station 106 may be in a GSO or a non-GSO. In either case, the base station 104 can obtain such orbit information of the bases station 106. For example, the base station can obtain the orbit information from the base station 106. The base station 104 can also obtain the orbit information from a backhaul network via one or more ground stations. The base station 104 can transmit the orbit information to the UE 102 by including the orbit information in the handover command.

Figure 2:
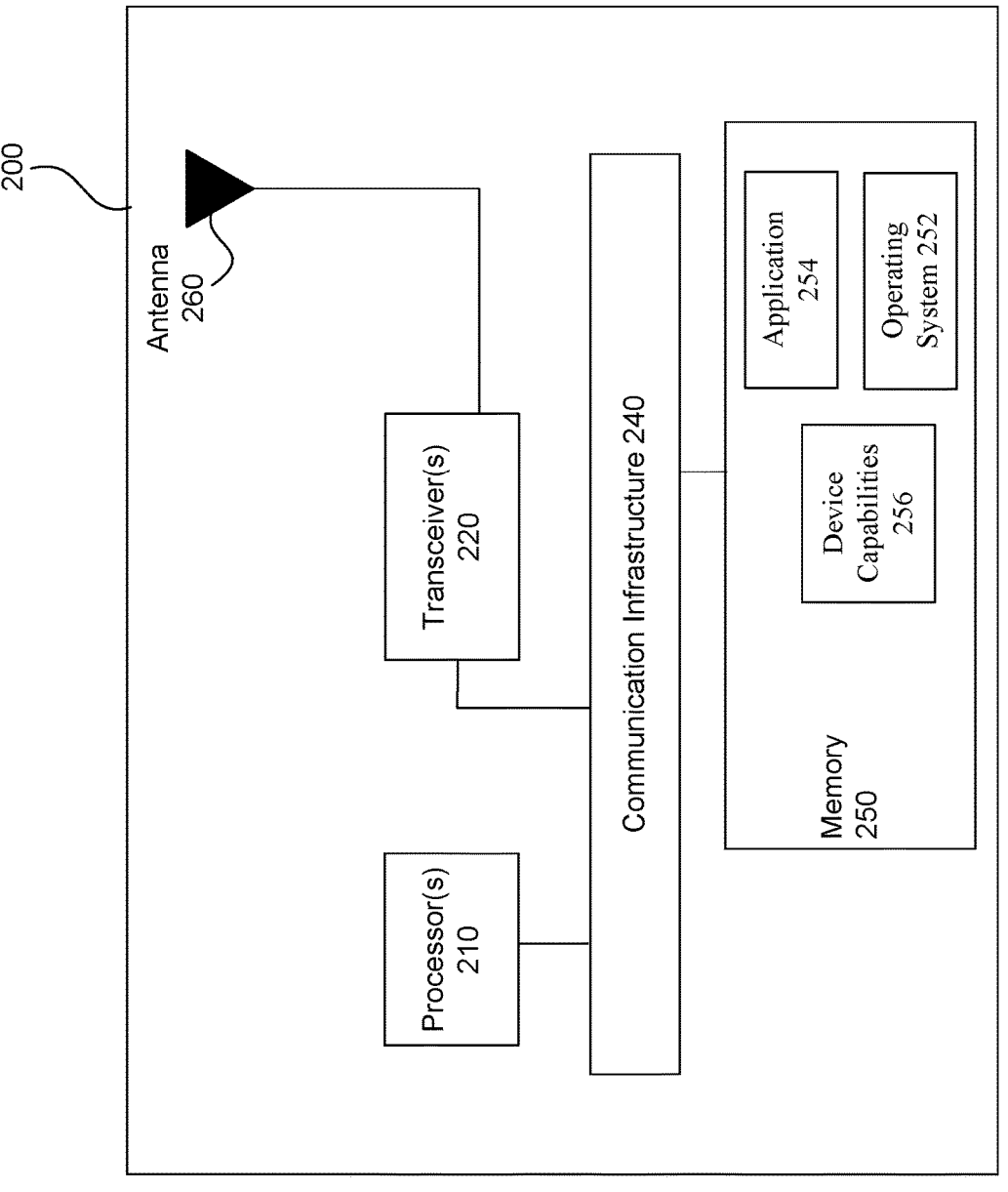
FIG. 2 illustrates a block diagram of an example system of an electronic device for the NTN handover procedure, according to some aspects of the disclosure.

FIG. 2 illustrates a block diagram of an electronic device 200 implementing the epoch time acquisition process, according to some aspects of the disclosure. The electronic device 200 may be any of the electronic devices (e.g., the UE 102 and the base stations 104 and 106) of the system 100. The electronic device 200 includes a processor 210, transceivers 220, a communication infrastructure 240, a memory 250, an operating system 252, an application 254, device capabilities 256, and antennas 260. Illustrated systems are provided as exemplary parts of electronic device 200, and electronic device 200 may include other circuit(s) and subsystem(s). Also, although the systems of electronic device 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by the electronic device 200 and/or a user of the electronic device 200. The applications in the application 254 may include applications such as, but not limited to, radio streaming, video streaming, remote control, and/or other user applications. In some aspects, the device capabilities 256 may be stored in the memory 250.

The electronic device 200 may also include the communication infrastructure 240. The communication infrastructure 240 provides communication between, for example, the processor 210, the transceivers 220, and the memory 250. In some implementations, the communication infrastructure 240 may be a bus.

The transceivers 220 transmit and receive communications signals include legacy reference signals and other data communication signals. Additionally, the transceivers 220 transmit and receive communications signals that support mechanisms for measuring communication link(s), generating and transmitting system information, and receiving the system information. According to some aspects, the transceivers 220 may be coupled to the antennas 260 to wirelessly transmit and receive the communication signals. The antennas 260 may include one or more antennas that may be the same or different types and can form one or more antenna ports. The transceivers 220 allow electronic device 200 to communicate with other devices that may be wired and/or wireless. In some examples, the transceivers 220 may include processors, controllers, radios, sockets, plugs, buffers, and like circuits/devices used for connecting to and communication on networks. According to some examples, the transceivers 220 include one or more circuits to connect to and communicate on wired and/or wireless networks.

Additionally, the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the transceivers 220 may be configured to operate according to one or more of Rel-15, Rel-16, Rel-17, or other releases of 3GPP standard.

In addition, one or more transceivers can include one or more circuits for connecting to and communicating with satellite networks. Such satellite networks can include, but are not limited to, wireless communication networks such as 3G/4G/5G networks such as Universal Mobile Telecommunications System (UMTS), Long-Term Evolution (LTE), as well as specific satellite communications network protocols for gateway functionality and control functionality from satellite ground stations. For example, one or more transceivers 220 can be configured to operate according to one or more of Rel-15, Rel-16, Rel-17, or other of the 3GPP standard. In addition, for LEO-earth-fixed types of satellites (see below), additional capability is provided to steer beams towards fixed points on the Earth's surface by either beamforming or by a mechanically steerable beam approach.

As discussed in more detail below with respect to FIGS. 3-7, processor 210 may implement different mechanisms for the epoch time acquisition process as discussed with respect to the system 100 of FIG. 1. For example, in some embodiments, memory 250 can store instructions, that when executed by processor 210 cause processor 210 to perform or cause the electronic device 200, to perform operations described herein, e.g., operations to support epoch time acquisition in an NTN. Alternatively, processor 210 can be "hard-coded" to perform the operations described herein. In some embodiments, processor 210 can be configured to perform operations described in FIGS. 3-6.

Figure 3:
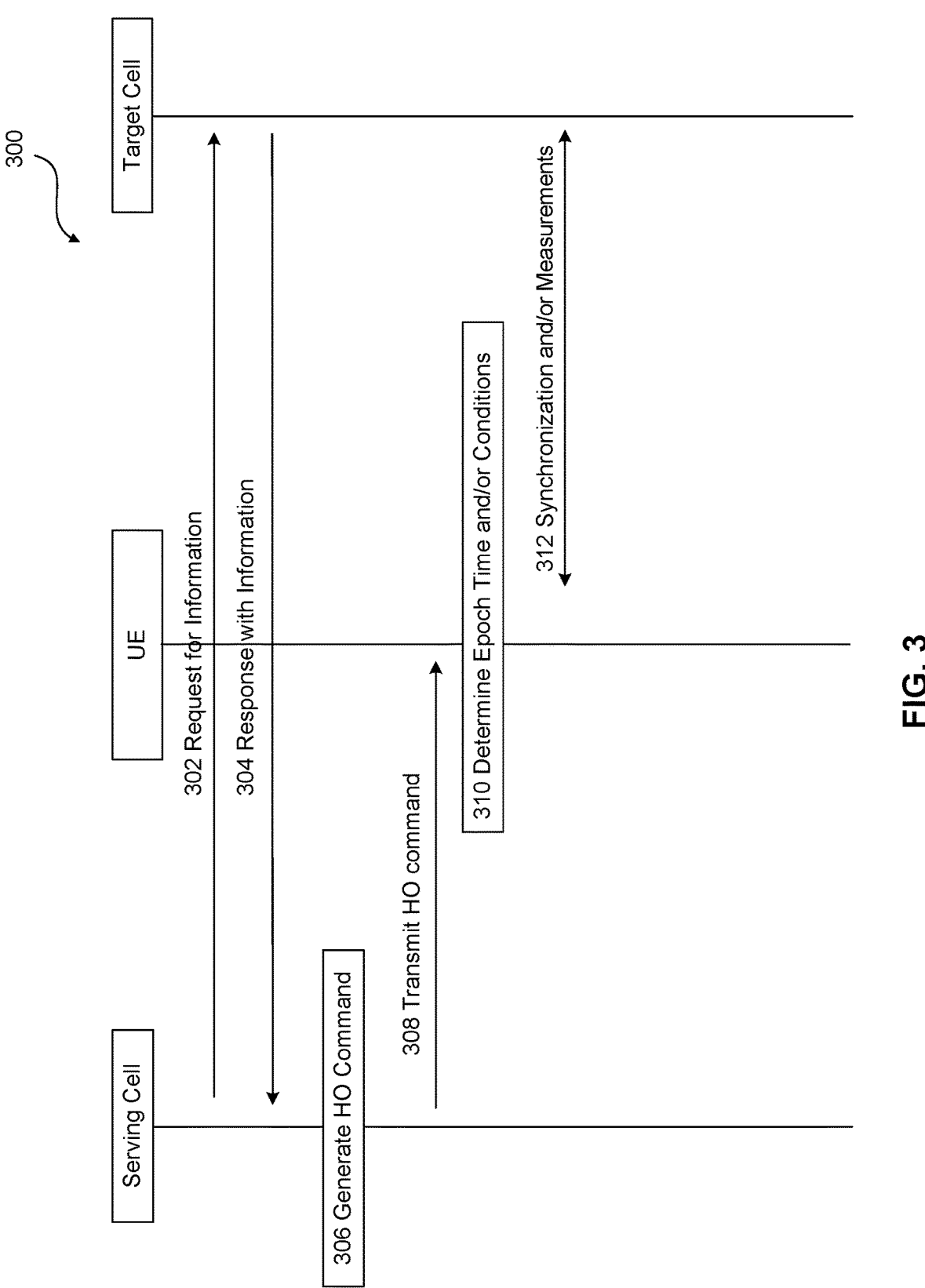
FIG. 3 illustrates an example method of the NTN handover procedure, according to aspects of the disclosure.

FIG. 3 illustrates an example method 300 of the NTN handover procedure. The example method 300 is provided for the purpose of illustration only and does not limit the disclosed aspects. As a convenience and not a limitation, FIG. 3 may be described with regard to elements of FIGS. 1, 2, and 7. The example method 300 may represent the operation of electronic devices (for example, the UE 102 and the base stations 104 and 106 of FIG. 1) implementing the NTN handover procedure. The example method 300 may also be performed by the electronic device 200 of FIG. 2, controlled or implemented by processor 210, and/or computer system 700 of FIG. 7. But the example method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, a first base station that supports a serving cell, such as the base station 104, transmits a request for information to a second base station that supports a target cell, such as the base station 106. In some aspects, the request indicates ephemeris information and an epoch index of the target cell. As discussed above, the first base station can repeatedly transmit the request to the second base station to obtain updated ephemeris information and epoch index of the target cell. The first base station can also transmit the request to the second base station in response to determining a UE, such as the UE 102, needs to hand over to the target cell. In some aspects, the first base station can transmit the request via a communication link, such as the communication link 112, between the first base station and the second base station.

At 304, the second base station transmits a response with information to the second base station. In some aspects, the response can include the ephemeris information and the epoch index of the target cell. The epoch index can be in reference to timing of the target cell or timing of the serving cell.

At 306, the first base station generates a handover (HO) command. The HO command can include the ephemeris information and the epoch index of the target cell. In some aspects, the epoch index received from the second base station is in reference to the timing of the target cell. In such a case, the first base station can update the epoch index to be in reference to the timing of the serving cell. Thus, regardless of whether the epoch index received from the second base station is in reference to the timing of the serving cell, the HO command includes the epoch index that is in reference to the timing of the serving cell.

At 308, the first base station can transmit the HO command to the UE. For example, the first base station can transmit the HO command to the UE via the communication link 108.

At 310, the UE can determine an epoch time of the target cell. For example, the UE can determine the epoch time based on the epoch index received from the first base station. As discussed above, the epoch index is in reference to the timing of the serving cell. In such a case, as discussed in more detail below, the UE can determine the epoch time of the target cell.

In some aspects, the UE can also determine conditions of the second base station. For example, the HO command may indicate whether the second base station that supports the target cell is in a GSO or a non-GSO. The UE may determine, based on the HO command, that the second base station is in a GSO and proceeds to step 312 without determining the epoch time. The UE may also determine whether to use the HO command to determine the epoch time. For example, as discussed in more detail below, the UE can determine the epoch time based on neighbor cell system information that is previously received from the first base station.

At 312, the UE performs synchronization and/or measurements based on the ephemeris information and the epoch time. As discussed above, the ephemeris information comprises position and velocity information of the second base station and is required for the UE to perform the synchronization, such as downlink synchronization, and other measurements, such as signals strengths and correlation values measurements, of the target cell. In addition, the epoch time indicates when the ephemeris information becomes effective because the second base station may change its position and/or velocity from time to time. Therefore, the UE can apply the ephemeris information based on the epoch time to perform the synchronization and the measurements.

Figure 4:
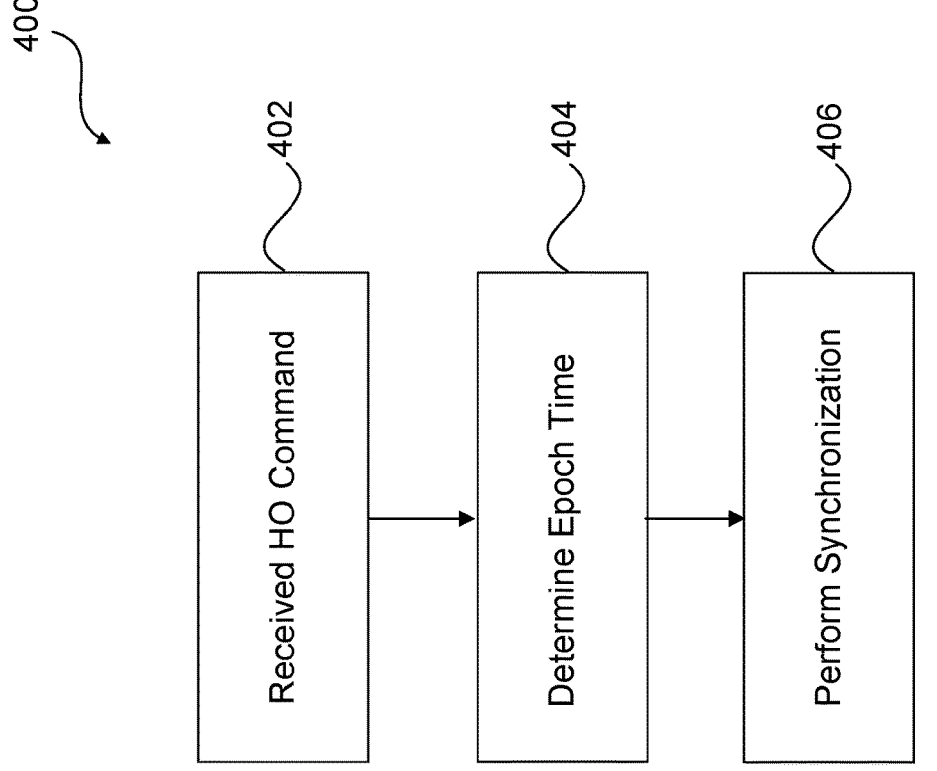
FIG. 4 illustrates an example method of an epoch time acquisition process, according to aspects of the disclosure.

FIG. 4 illustrates an example method 400 of an epoch time acquisition process. The example method 400 is provided for the purpose of illustration only and does not limit the disclosed aspects. As a convenience and not a limitation, FIG. 4 may be described with regard to elements of FIGS. 1, 2, and 7. The example method 400 may represent the operation of electronic devices (for example, the UE 102 of FIG. 1) implementing the epoch time acquisition process. The example method 400 may also be performed by the electronic device 200 of FIG. 2, controlled or implemented by processor 210, and/or computer system 700 of FIG. 7. But the example method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

At 402, the UE receives a HO command from a first base station that supports a serving cell as described in 308 of FIG. 3. The HO command comprises an epoch index and ephemeris information of a target cell supported by a second base station.

At 404, the UE determines an epoch time of the target cell based on the epoch index. In some aspects, the epoch index is in reference to timing of the serving cell. In such a case, the UE can determine the epoch time based on the epoch index directly because the UE is synchronized with the serving cell. In some aspects, the epoch index is in reference to the timing of the serving cell, but with a time offset. In such a case, the UE can determine the epoch time based on the epoch index and the time offset. The UE can determine the time offset based on the HO command received from the first base station. The first base station can also notify the UE of the time offset via a configuration message prior to transmitting the HO command.

Figure 6:
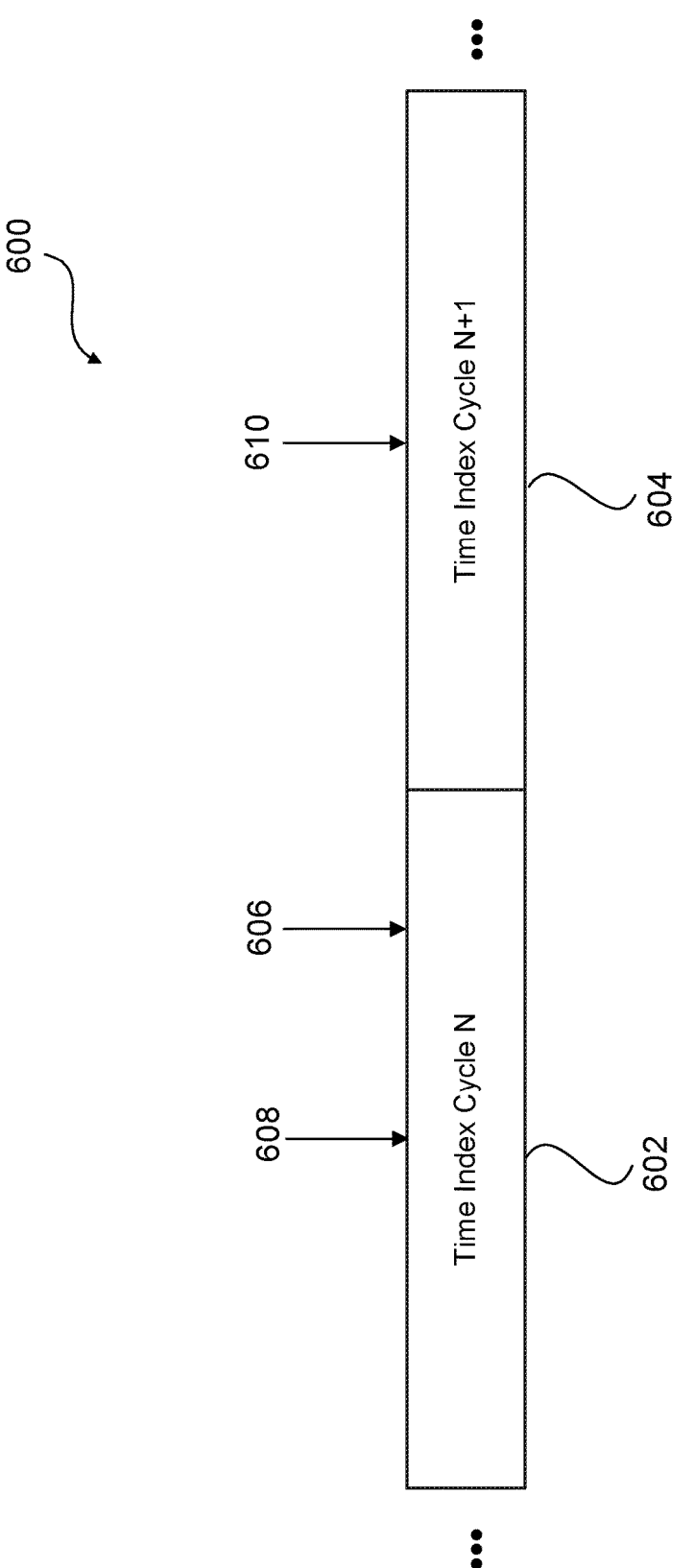
FIG. 6 illustrates an example of time index cycles, according to aspects of the disclosure.

In some aspects, the epoch index can be a subframe number, a system frame number (SFN), a hyper frame number (HFN)/hyper SFN, and/or a combination thereof. In such a case, the UE further determines whether the epoch time is prior to or after the time of receiving the epoch index. For example, the SFN is a sequence from 0 to 1023 that repeats over multiple cycles, as shown in FIG. 6 below. If the epoch index is an SFN, the epoch index corresponds the SFN in every SFN cycle and thus the UE is unsure which SFN the epoch time corresponds to. To resolve the ambiguity, the UE may determine or the first base station may configure the UE to determine that the epoch time corresponds to either a matching SFN that is an SFN cycle when the HO command is received or a matching SFN that is in an SFN cycle closest to the time when the HO command is received. However, the UE may still need to choose between two matching SFNs. In such a case, the first base station can notify the UE which one of the two matching SFNs to choose. For example, the first base station can indicate in the HO command or a configuration message whether the epoch time corresponds to an SFN prior to or after the time that the HO command is received. Step 404 can be further described by FIG. 6 and the corresponding discussion provided herein.

In some aspects, the UE can determine the epoch time based on neighbor cell system information. For example, the first base station may gather information of neighbor cells, such as the target cell, repeatedly and prior to the handover operation of the UE. Thus, the first base station may obtain the epoch index and the ephemeris information prior to the UE moving toward the second base station and requires the handover operation to the target cell. The first base station can also transmit the neighbor cell system information, such as the epoch index and the ephemeris information of the target cell, to the UE periodically. For example, the first base station can transmit the neighbor cell system information to the UE periodically via a system information block, such as NTN-neighcellconfig-r17. The epoch index may be in reference to the timing of the serving cell and thus the UE can determine the epoch time based on the epoch index. In some aspects, the UE can determine whether to calculate the epoch time of the target cell based on the HO command or the neighbor cell system information based on a configuration message received from the first base station.

At 406, the UE performs synchronization with a target cell, such as the target cell of FIG. 3 based on the ephemeris information received in step 402 and the epoch time determined in step 404.

Figure 5:
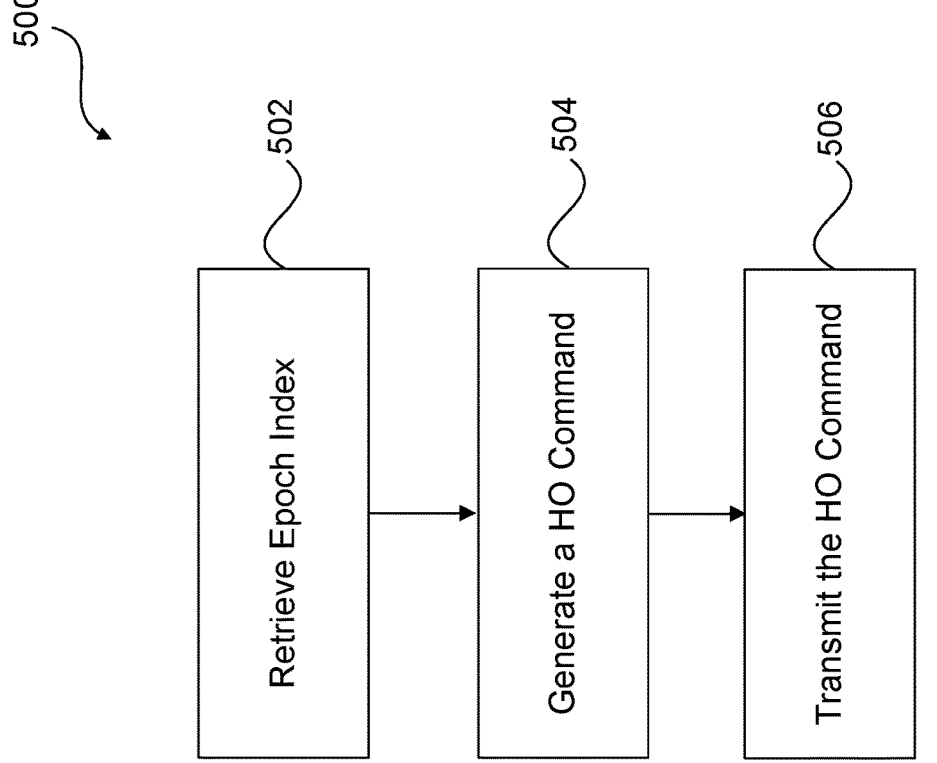
FIG. 5 illustrates an example method of generating and transmitting a handover command, according to aspects of the disclosure.

FIG. 5 illustrates an example method 500 of generating and transmitting a handover command. The example method 500 is provided for the purpose of illustration only and does not limit the disclosed aspects. As a convenience and not a limitation, FIG. 5 may be described with regard to elements of FIGS. 1, 2, and 7. The example method 500 may represent the operation of electronic devices (for example, the base stations 104 and 106 of FIG. 1) implementing generating and transmitting the handover command. The example method 500 may also be performed by the electronic device 200 of FIG. 2, controlled or implemented by processor 210, and/or computer system 700 of FIG. 7. But the example method 500 is not limited to the specific aspects depicted in those figures and other systems may be used to perform the method, as will be understood by those skilled in the art. It is to be appreciated that not all operations may be needed, and the operations may not be performed in the same order as shown in FIG. 5.

At 502, a first base station that supports a serving cell, receives an epoch index of a target cell. As discussed above, the first base station can transmit a request for information to a second base station that supports a target cell to obtain the ephemeris information and the epoch index of the target cell. The first base station transmits the request repeatedly or after determining that a UE served by the serving cell needs to handover to the target cell.

At 504, the first base station generates a HO command, wherein the HO command comprises the epoch index and the ephemeris information of the target cell, supported by the second base station. In some aspects, the epoch index received from the second base station may be in reference to timing of the target cell. In such a case, the first base station can convert the epoch index to an updated epoch index that is in reference to timing of the serving cell. The epoch index conversion of the first base station is further described by the discussion of FIG. 6.

At 506, the first base station can transmit the HO command to the UE. For example, the first base station can transmit the HO command to the UE via the communication link 108 of FIG. 1.

FIG. 6 illustrates an example 600 of time index cycles, to further illustrate one or more operations of FIGS. 3-5 described above. The example 600 is provided for the purpose of illustration only and does not limit the disclosed aspects. As a convenience and not a limitation, FIG. 6 may be described with regard to elements of FIGS. 1, 2, and 7. The example 600 may represent the operation of electronic devices (for example, the UE 102 and the base stations 104 and 106 of FIG. 1). The example 600 may also be performed by the electronic device 200 of FIG. 2, controlled or implemented by processor 210, and/or computer system 700 of FIG. 7. But the example 600 is not limited to the specific aspects depicted in those figures and other systems may be used to perform the method, as will be understood by those skilled in the art. It is to be appreciated that not all operations may be needed, and the operations may not be performed in the same order as shown in FIG. 6.

FIG. 6 illustrates time index cycles that include time index cycles N and N+1. The time index cycles can correspond to the serving cell of FIG. 3 that is supported by a first base station, such as the base station 104 of FIG. 1. In some aspects, the time index cycles can be SFN cycles and an epoch index can be an SFN. As discussed above, the SFN repeats from 0 to 1023. The SFN completes an SFN cycle when the SFN runs from 0 to 1023 and enters a next SFN cycle. In some aspects, the SFN increments by 1 every 10 ms. Therefore, the SFN goes through one SFN cycle in 10.24 seconds. Because the UE is synchronized with the serving cell when connecting to it, the UE is aware of a current value of the SFN that is running at the serving cell. Therefore, the first base station can indicate a time point to a UE using the SFN. For example, a HO command generated and transmitted by the first base station, such as the HO command of the steps 306 and 308 of FIG. 3, the step 402 of FIG. 4, and the steps 504 and 506 of FIG. 6, can indicate to the UE via an epoch index that the time point is when the SFN becomes 700. When the HO command is received, the UE may determine that the current value of the SFN at the serving cell is 200. Thus the UE determines that the time point indicated by the first base station arrives after the SFN increments 500 times, which is 500*10 ms=5000 ms=5 seconds after the current time. In other words, if the first base station indicates that a message will be transmitted when SFN becomes 700, the UE understand that the message will be transmitted in 5 seconds. In some aspects, the UE determines the epoch time in the step 310 of FIG. 3 and the step 404 of FIG. 4 as described here. In summary, the SFN at the serving cell and the SFN interpretation at the UE act like two synchronized watches possessed by the first base station and the UE. Thus, a time point indicated by the first base station can be understood by the UE.

In some aspects, the UE may receive a HO command from the first base station at a time point 606 within a time index cycle 602. The time point 606 corresponds to a first value of the SFN at the serving cell, such as 900. Furthermore, the HO command may include an epoch index 512. As discussed above, an epoch time indicated by the epoch index is either within a same SFN cycle or within a next closest SFN cycle. In such a case, the epoch time can be either a time point 608 or a time point 610, wherein the time point 608 corresponds to an SFN value 512 in the time index cycle 602 and the time point 610 corresponds to an SFN value 512 in a time index cycle 604. The first base station can configure the UE whether to choose a time point prior to or after receiving the HO command. If the first base station configures the UE to choose the epoch time that is prior to receiving the HO command, the epoch time is the time point 608. Because an index difference between the time points 608 and 606 is 900−512=388, the UE can determine that the epoch time is 3880 ms before receiving the HO command. On the other hand, if the first base station configures the UE to choose the epoch time that is after receiving the HO command, the epoch time is the time point 610. Because an index difference between the time points 606 and 610 is 1024−900+512=636, the UE can determine that the epoch time is 6360 ms after receiving the HO command. In some aspects, the UE determines the epoch time in the step 310 of FIG. 3 and the step 404 of FIG. 4 as described above and herein.

In some aspects, the HO command also includes a time offset or an index offset. For example, the HO command can include a time offset of 300 ms or an index offset of 30. In such a case, after the UE calculates the epoch time of the target cell, such as 3880 ms prior to or 6360 ms after receiving the HO command, the UE updates the epoch time of the target cell with the time offset or the index offset. Specifically, if the epoch time is 3880 ms prior to receiving the HO command, the UE can increase 300 ms and thus update the epoch time to be 3580 ms prior to receiving the HO command. Similarly, if the epoch time is 6360 ms after receiving the HO command, the UE can increase 300 ms and thus update the epoch time to be 6660 ms after receiving the HO command. In some aspects, the time offset or the index offset corresponds to time differences or index differences between the serving cell and the target cell. For example, the time offset 300 ms can indicate that the serving cell is 300 ms ahead of the target cell. Similarly, the index offset of 30 can indicate that the SFN of the serving cell is smaller than the SFN of the target cell by 30. In some aspects, the serving cell can determine the time offset or the index offset because the serving cell is synchronized with the target cell. This approach can also be understood as the epoch index is in reference to the timing of the target cell, but the serving cell enables the UE to use the epoch index without synchronizing with the target cell by providing the time offset or the index offset to the UE, where the offset is relative to the SFN of the serving cell.

In some aspects, the serving cell can convert the epoch index based on the time offset or the index offset. For example, the serving cell receives the epoch index as 512 from the target cell. The serving cell can determine that the index difference between the serving cell and the target cell is 30. In such a case, the serving cell can convert the epoch index to 542 and include the converted epoch index in the HO command. Thus, the serving cell does not need to include the time offset or the index offset in the HO command. Similarly, the UE does not need to adjust the epoch time with the time offset or the index offset.

In some aspects, the time offset or the index offset can also be negative values. For example, the time offset can be −300 ms and the index offset can be −30. In such a case, the epoch time of 3880 ms prior to receiving the HO command is adjusted to 4180 ms prior to receiving the HO command and the epoch time of 6360 ms after receiving the HO command is adjusted to 6060 ms after receiving the HO command. In some aspects, the HO command can include a parameter to indicate whether the time offset or the index offset is positive or negative.

In some aspects, the epoch index can also indicate a subframe number. In some aspects, the subframe number repeats from 0-9 and increments every 1 ms. Thus, the subframe number, in addition to the SFN, can indicate a more accurate time than the SFN alone. For example, the epoch index can indicate an SFN 512 and a subframe number 4. In such a case, based on the above discussed example, the epoch time can be 3876 ms prior to receiving the HO command or 6364 ms after receiving the HO command. In some aspects, the epoch index can also indicate a hyper frame number (HFN) or a hyper SFN. The HFN repeats from 0-1023 and increments by 1 every 10.24 seconds. In some aspects, the epoch index can be associated with a slot index. For example, the slot index can indicates at which time slot the ephemeris information becomes effective. In addition, as discussed above, the first base station can configure the UE to choose a time point prior to or after receiving the HO command. Therefore, the first base station can configure the UE to choose a closest past SFN, a closest past subframe number, or a closest past slot index or a closest future SFN index, a closest future subframe number, or a closest future slot index.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some aspects, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 608, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Figure 7:
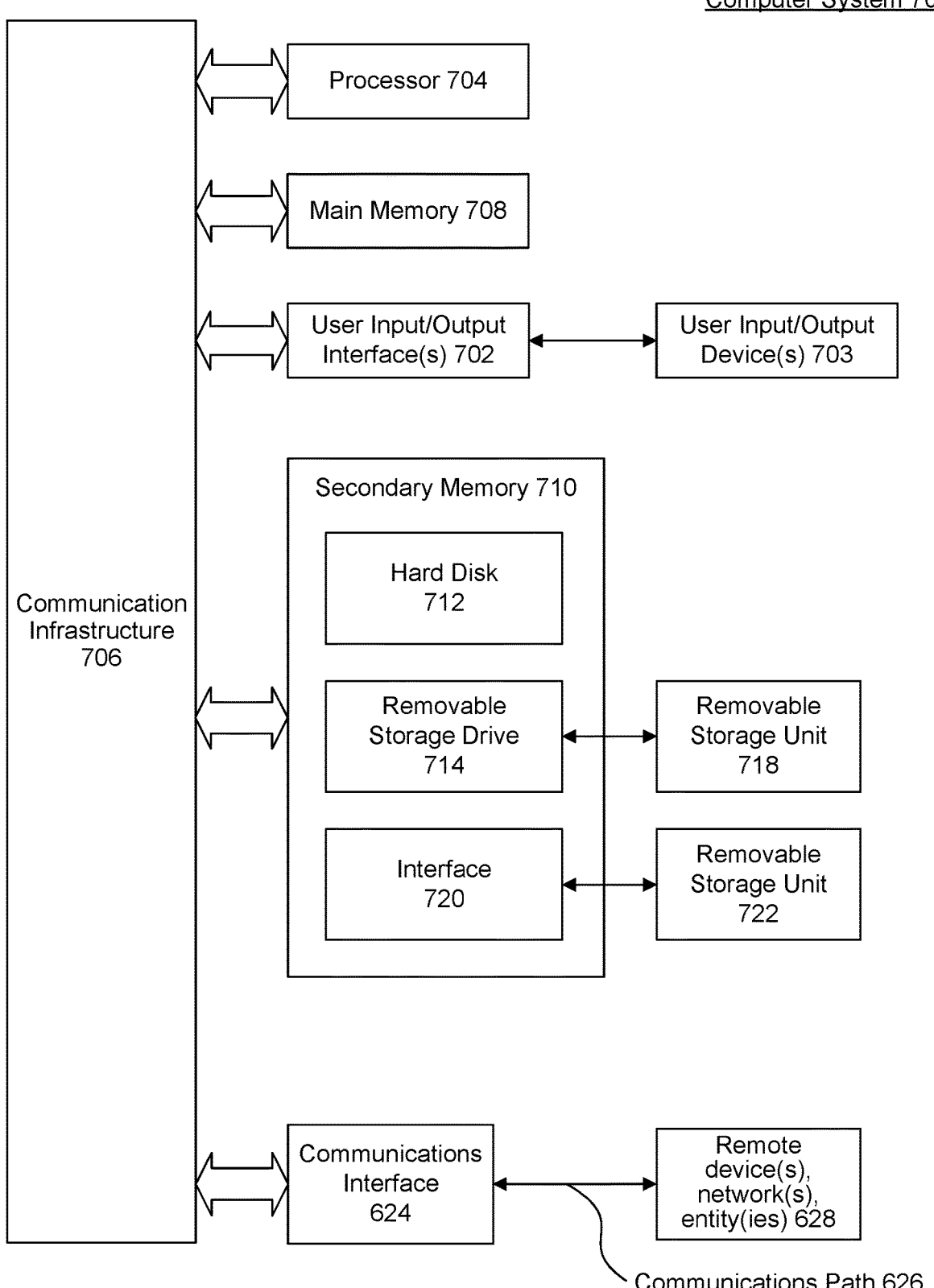
FIG. 7 is an example computer system for implementing some aspects of the disclosure or portion(s) thereof.

Based on the teachings contained in this disclosure, it will be apparent to persons skilled in the relevant art(s) how to make and use aspects of the disclosure using data processing devices, computer systems and/or computer architectures other than that shown in FIG. 7. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE) comprising:

a transceiver configured to enable wireless communication with a serving cell and a target cell; and a processor communicatively coupled to the transceiver and configured to:

receive, using the transceiver, a handover command from the serving cell, wherein the handover command comprises an epoch index and ephemeris information of the target cell;

determine an epoch time of the target cell based on the epoch index; and perform time synchronization with the target cell using the epoch time and the ephemeris information, wherein to perform the time synchronization with the target cell using the epoch time and the ephemeris information of the target cell, the processor is further configured to determine that the target cell is associated with a geostationary orbit of a satellite.

2. The UE of claim 1, wherein to determine the epoch time, the processor is further configured to:

determine that the epoch index corresponds to the serving cell;

determine a current time index of the serving cell; and determine the epoch time based on the epoch index and the current time index.

3. The UE of claim 1, wherein the epoch index comprises one of a system frame number (SFN), a subframe number, or a slot index.

4. The UE of claim 1, wherein the handover command indicates whether the epoch index is in reference to timing of the serving cell.

5. The UE of claim 1, wherein the processor is further configured to:

determine the epoch time based on the epoch index and an offset value, wherein the handover command includes the offset value.

6. The UE of claim 1, wherein the processor is further configured to:

receive, using the transceiver, neighbor cell system information from the serving cell, wherein the neighbor cell system information comprise a second epoch index of the target cell; and determine the epoch time based on the second epoch index.

7. A method of operating a user equipment (UE) comprising:

receiving a handover command from a serving cell, wherein the handover command comprises an epoch index and ephemeris information of a target cell;

determining an epoch time of the target cell based on the epoch index; and performing time synchronization with the target cell using the epoch time and the ephemeris information, wherein the performing the time synchronization with the target cell using the epoch time and the ephemeris information further comprises determining that the target cell is associated with a geostationary orbit of a satellite.

8. The method of claim 7, wherein the determining the epoch time further comprises:

determine that the epoch index corresponds to the serving cell;

determine a current time index of the serving cell; and determine the epoch time based on the epoch index and the current time index.

9. The method of claim 7, wherein the handover command indicates whether the epoch index is in reference to timing of the serving cell.

10. The method of claim 7, further comprising:

determine the epoch time based on the epoch index and an offset value, wherein the handover command includes the offset value.

11. The method of claim 7, further comprising:

receiving neighbor cell system information from the serving cell, wherein the neighbor cell system information comprise a second epoch index of the target cell; and determining the epoch time based on the second epoch index.

12. A base station comprising:

a transceiver configured to enable wireless communication with a user equipment (UE) and a second base station; and a processor communicatively coupled to the transceiver and configured to:

generate a handover command that comprises an epoch index and ephemeris information of the second base station;

transmit, using the transceiver, the handover command to the UE;

generate a configuration message that indicates whether the epoch index is associated with:

one of a closest past system frame number (SFN), a closest past subframe number, or a closest past slot index, or one of a closest future SFN index, a closest future subframe number, or a closest future slot index; and transmit, using the transceiver, the configuration message to the UE, wherein the epoch index is in reference to timing of the base station, and wherein the epoch index is associated with an epoch time for the UE to perform time synchronization with the second base station.

13. The base station of claim 12, wherein to generate the handover command, the processor is further configured to:

transmit a request for information to the second base station;

receive a response from the second base station, wherein the response includes a second epoch index and the ephemeris information; and convert the second epoch index to the epoch index.

14. The base station of claim 12, wherein to generate the handover command, the processor is further configured to:

determine a time offset between the base station and the second base station, wherein the handover command includes the time offset.

15. The base station of claim 14, wherein the handover command further indicates whether the time offset is positive of negative.

16. The base station of claim 12, wherein the processor is further configured to:

generate a configuration message that configures the UE whether to determine the epoch time based the epoch index or a second epoch index of neighbor cell system information; and transmit, using the transceiver, the configuration message to the UE.

* * * * *